United States Patent
Chen et al.

(10) Patent No.: US 9,158,087 B2
(45) Date of Patent: Oct. 13, 2015

(54) STEREOSCOPIC LENS DOCKING STATION

(75) Inventors: Hsin-Shuay Chen, New Taipei (TW);
Yu-Teng Chang, New Taipei (TW);
Ming-Te Lee, New Taipei (TW);
Yao-Wei Wang, New Taipei (TW)

(73) Assignee: Wistron Corporation, New Taipei (TW)

( * ) Notice: Subject to any disclaimer, the term of this patent is extended or adjusted under 35 U.S.C. 154(b) by 428 days.

(21) Appl. No.: 13/605,911

(22) Filed: Sep. 6, 2012

(65) Prior Publication Data
US 2013/0278722 A1    Oct. 24, 2013

(30) Foreign Application Priority Data
Apr. 24, 2012  (TW) .............................. 101114557 A

(51) Int. Cl.
| H04N 13/02 | (2006.01) |
| G02B 7/02 | (2006.01) |
| G03B 35/08 | (2006.01) |
| H04M 1/21 | (2006.01) |
| H04M 1/02 | (2006.01) |
| G03B 5/02 | (2006.01) |

(52) U.S. Cl.
CPC  *G02B 7/023* (2013.01); *G03B 5/02* (2013.01); *G03B 35/08* (2013.01); *H04M 1/0254* (2013.01); *H04M 1/21* (2013.01); *H04M 1/0264* (2013.01)

(58) Field of Classification Search
CPC .......................... H40N 13/0239; H40N 13/0055
USPC .......................... 348/42, 46, 47, E13.074, 375; 455/556.1
See application file for complete search history.

(56) References Cited

U.S. PATENT DOCUMENTS

| 7,102,686 | B1* | 9/2006 | Orimoto et al. ................ 348/375 |
| 7,948,515 | B1* | 5/2011 | Hines ............................... 348/47 |
| 8,456,515 | B2* | 6/2013 | Li et al. ........................... 348/42 |
| 2005/0191048 | A1* | 9/2005 | Ramadan ...................... 396/329 |
| 2010/0134597 | A1* | 6/2010 | Wu et al. ......................... 348/47 |
| 2011/0117958 | A1* | 5/2011 | Kim et al. .................. 455/556.1 |
| 2011/0234767 | A1* | 9/2011 | Tokiwa ........................... 348/47 |
| 2011/0309728 | A1* | 12/2011 | Diebel ........................ 312/293.1 |
| 2012/0056998 | A1* | 3/2012 | Kang et al. ..................... 348/47 |
| 2012/0105579 | A1* | 5/2012 | Jeon et al. ....................... 348/38 |
| 2012/0157159 | A1* | 6/2012 | Jang et al. ................. 455/556.1 |
| 2012/0268569 | A1* | 10/2012 | Kurokawa ..................... 348/47 |

* cited by examiner

*Primary Examiner* — Christopher S Kelley
*Assistant Examiner* — Kathleen Walsh
(74) *Attorney, Agent, or Firm* — Muncy, Geissler, Olds & Lowe, P.C.

(57) ABSTRACT

A stereoscopic lens docking station used for detachably connecting to an electronic device. The electronic device includes a first lens module and a first transmission interface. The stereoscopic lens docking station includes a chute, a second lens module, and a second transmission interface. The chute is located next to the first lens module. The second lens module can slide along the chute to a position corresponding to the first lens module. The second transmission interface is used for communicating to the first transmission interface, and for electrically connecting to the second lens module, allowing the electronic device to control the second lens module to capture an image, and obtain the image; whereby the two images captured by the first lens module and the second lens module can be integrated to form a three-dimensional image.

15 Claims, 10 Drawing Sheets

STEREOSCOPIC LENS DOCKING STATION

BACKGROUND OF THE INVENTION

1. Field of the Invention

The present invention relates to a stereoscopic lens docking station; more particularly, the present invention relates to a stereoscopic lens docking station for capturing a three-dimensional image.

2. Description of the Related Art

As technology develops, many portable electronic devices (such as a mobile phone, a camera, or a walkman) are designed to be thin and light, and include various functions to meet the customers' requirements. For example, as shown in FIG. 1, a mobile phone for capturing a three-dimensional image is developed. The mobile phone 100 includes a stereoscopic lens module 110 for capturing a three-dimensional image. The stereoscopic lens module 110 includes a first lens 111 and a second lens 112. The position of the first lens 111 and the position of the second lens 112 are fixed and arranged in certain spacing. The first lens 111 and the second lens 112 respectively include image sensors 1111, 1121. The image sensors 1111, 1121 are designed as a horizontal rectangle shape for capturing an image which matches the feature of human binocular vision that the width is greater than the height.

According to the three-dimensional imaging principle, the three-dimensional image is formed from two images of two different perspectives of a same scene, and the two positions of the two images must be on a same horizontal line. For example, as shown in FIG. 1, if the user wants to use the mobile phone 100 to capture a three-dimensional image, the user must place the mobile phone 100 horizontally (as shown in FIG. 1), allowing the first lens 111 and the second lens 112 to be on the same horizontal line for capturing the three-dimensional image. However, if the user places the mobile phone 100 vertically, then the first lens 111 and the second lens 112 will not be on the same horizontal line, such that the user cannot capture a three-dimensional image. Therefore, the mobile phone 100 can only be used for capturing a transverse three-dimensional image, and the mobile phone 100 cannot be used for capturing a vertical three-dimensional image.

Furthermore, because the mobile phone 100 shown in FIG. 1 includes the elements for capturing the three-dimensional image, such as the stereoscopic lens module 110 and other elements, the thickness of the mobile phone 100 is greater than that of a common mobile phone. Currently, the thickness of the mobile phone for capturing the three-dimensional image is about 12 millimeters, and the thickness of a common smart phone with a common lens module is about 7~9 millimeters. Therefore, according to the present technology, if the mobile phone includes the function of capturing three-dimensional images, then the thickness of the mobile phone will not be great enough to meet the requirement of the customer.

Furthermore, only a few companies produce and sell the abovementioned mobile phone with the stereoscopic lens module 110; this kind of mobile phone is more expensive than the common mobile phone with the common lens module; opportunities to capture three-dimensional images are not as numerous as those to capture normal images. Therefore, for the user who already has a mobile phone with a common lens module, or the user with brand loyalty who only uses mobile phones of a specific brand, it is not the best choice to purchase the mobile phone with the stereoscopic lens module.

Therefore, there is a need to provide a new device which can be applied to a mobile phone with a single lens module, allowing the mobile phone with a single lens module to be able to capture the transverse and vertical three-dimensional image, and allowing the mobile phone to keep its original thickness and weight.

SUMMARY OF THE INVENTION

It is an object of the present invention to provide a stereoscopic lens docking station for capturing a three-dimensional image. The stereoscopic lens docking station is used for detachably connecting to an electronic device, allowing the electronic device to be able to capture three-dimensional images.

To achieve the abovementioned object, in one embodiment of the present invention, the stereoscopic lens docking station of the present invention is used for detachably connecting to an electronic device; the electronic device includes a first lens module and a first transmission interface. The stereoscopic lens docking station includes a chute, a second lens module, and a second transmission interface. The chute is located next to the first lens module. The second lens module can slide along the chute to a position corresponding to the first lens module. The second transmission interface is used for communicating with the first transmission interface and for electrically connecting to the second lens module, allowing the electronic device to control the second lens module to capture an image and obtain the image; whereby the two images captured by the first lens module and the second lens module can be integrated to form a three-dimensional image.

According to one embodiment of the present invention, the stereoscopic lens docking station further includes a hole; the position of the hole is corresponding to the position of the first lens module of the electronic device, allowing the first lens module to be exposed to the hole.

Furthermore, in another embodiment of the present invention, the stereoscopic lens docking station of the present invention is used for detachably connecting to an electronic device; the electronic device includes a first transmission interface. The stereoscopic lens docking station of the present invention includes a chute, a first lens module, a second lens module, and a second transmission interface. The chute is located next to the first lens module. The second lens module can slide along the chute to a position corresponding to the first lens module. The second transmission interface is used for communicating to the first transmission interface, and for electrically connecting to the second lens module, allowing the electronic device to control the first lens module and the second lens module to respectively capture an image, and obtain the images; whereby the two images captured by the first lens module and the second lens module can be integrated to form a three-dimensional image.

According to one embodiment of the present invention, the first transmission interface and the second transmission interface are respectively an entity connector or a wireless transmission module.

According to one embodiment of the present invention, the stereoscopic lens docking station further includes a battery module for providing power to the stereoscopic lens docking station or for providing standby power to the electronic device via the entity connectors of the first transmission interface and the second transmission interface.

DETAILED DESCRIPTION OF THE PREFERRED EMBODIMENT

These and other objects and advantages of the present invention will become apparent from the following description of the accompanying drawings, which disclose several embodiments of the present invention. It is to be understood that the drawings are to be used for purposes of illustration only, and not as a definition of the invention.

Figure 1:
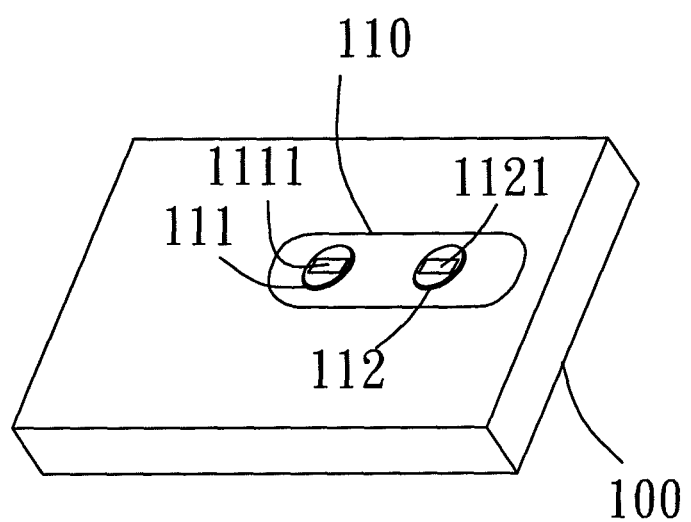
FIG. 1 illustrates a schematic drawing of a mobile phone with a stereoscopic lens module of the prior art.
Figure 2:
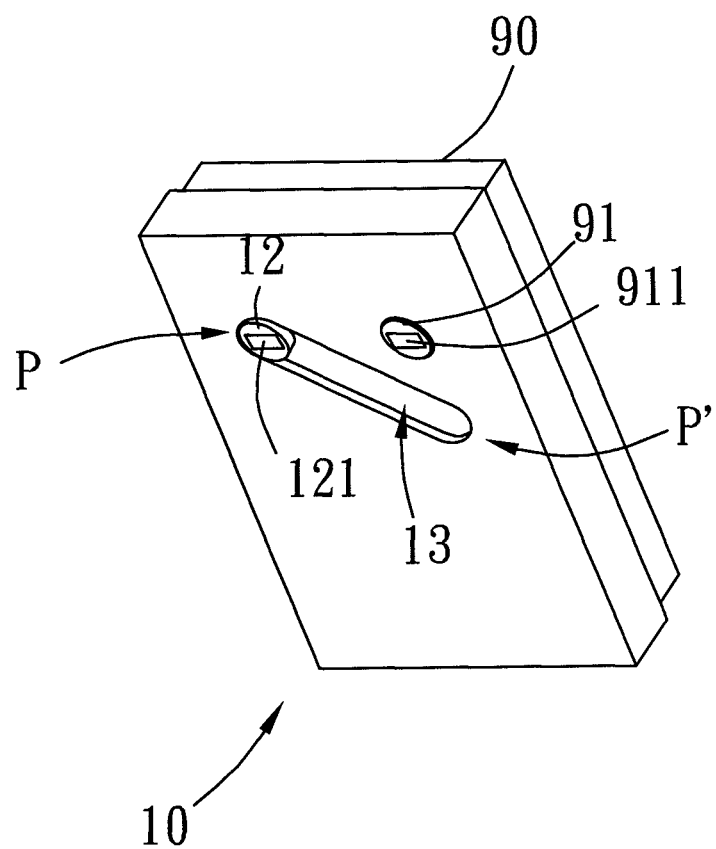
FIG. 2 illustrates an assembly schematic drawing of the stereoscopic lens docking station and the electronic device when the second lens module slides to the first position, according to the first embodiment of the present invention.
Figure 3:
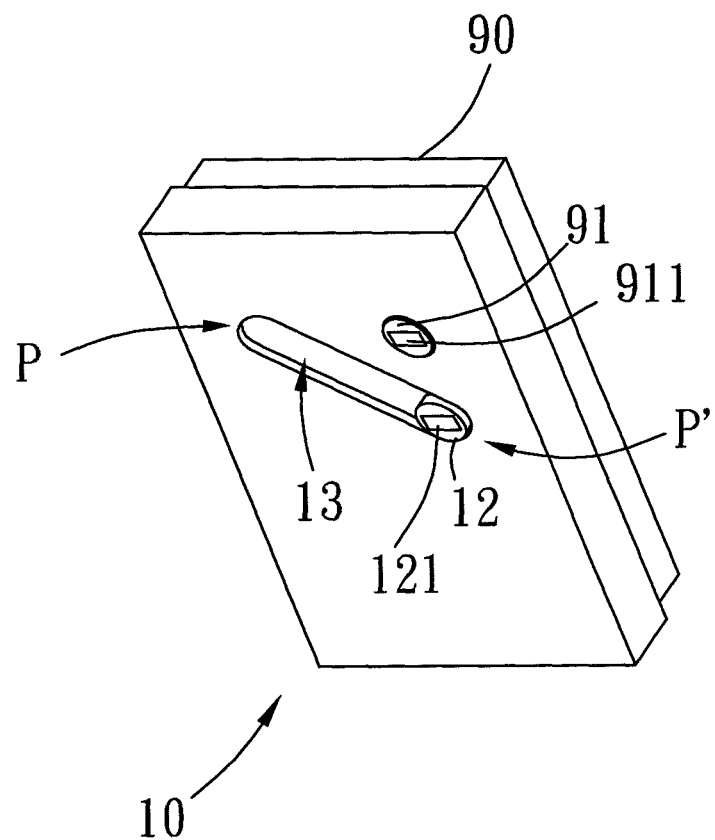
FIG. 3 illustrates an assembly schematic drawing of the stereoscopic lens docking station and the electronic device when the second lens module slides to the second position, according to the first embodiment of the present invention.
Figure 4:
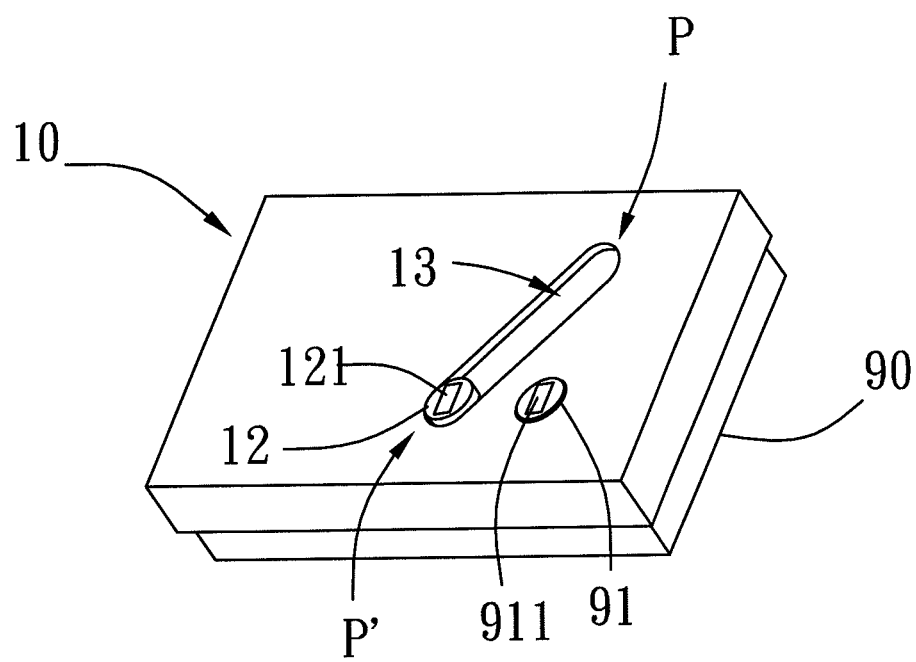
FIG. 4 illustrates an assembly schematic drawing of the transverse stereoscopic lens docking station and the transverse electronic device when the second lens module slides to the second position, according to the first embodiment of the present invention.
Figure 5:
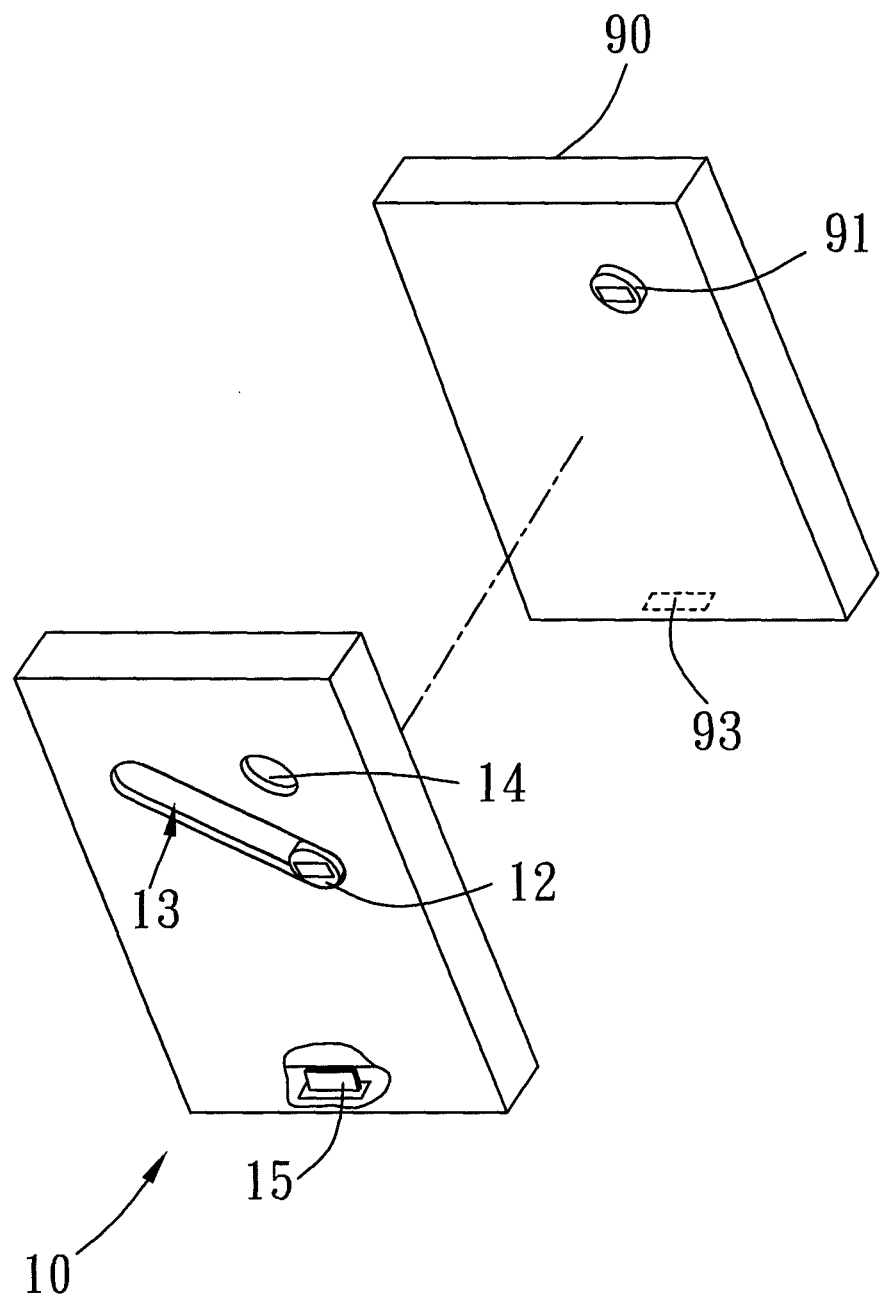
FIG. 5 illustrates a schematic drawing of the stereoscopic lens docking station and the electronic device with entity connectors according to the first embodiment of the present invention.
Figure 6:
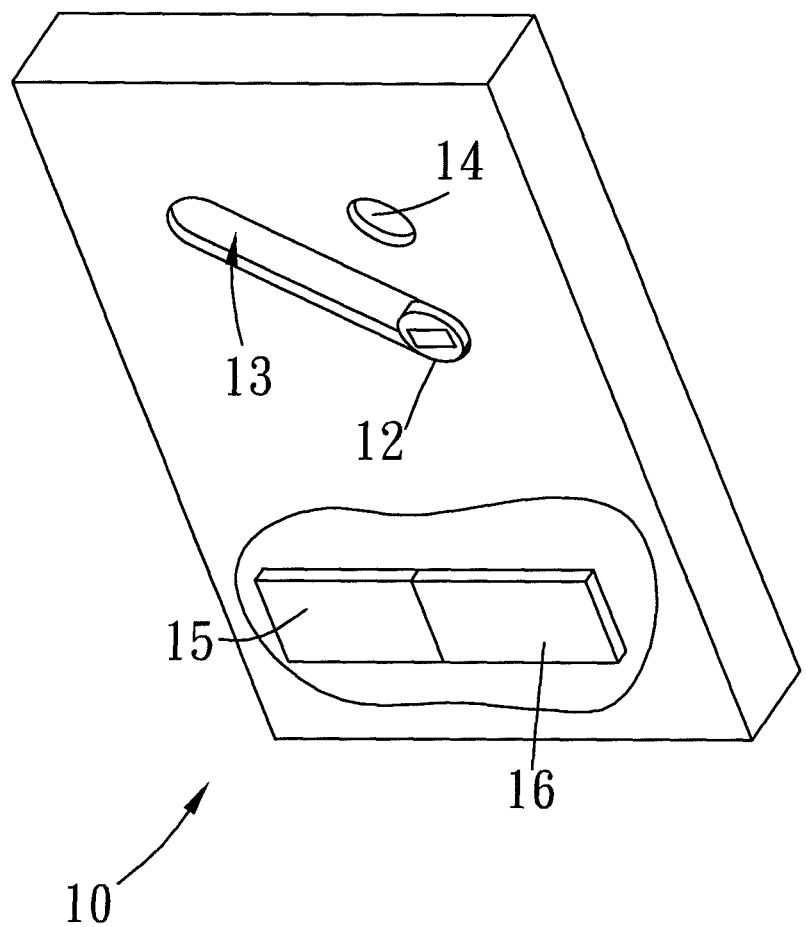
FIG. 6 illustrates a schematic drawing of the stereoscopic lens docking station with the wireless transmission module according to the first embodiment of the present invention.

Please refer to FIG. 2 to FIG. 6 about the stereoscopic lens docking station of the present invention according to the first embodiment. FIG. 2 illustrates an assembly schematic drawing of the stereoscopic lens docking station and the electronic device when the second lens module slides to the first position, according to the first embodiment of the present invention. FIG. 3 illustrates an assembly schematic drawing of the stereoscopic lens docking station and the electronic device when the second lens module slides to the second position, according to the first embodiment of the present invention. FIG. 4 illustrates an assembly schematic drawing of the transverse stereoscopic lens docking station and the transverse electronic device when the second lens module slides to the second position, according to the first embodiment of the present invention. FIG. 5 illustrates a schematic drawing of the stereoscopic lens docking station and the electronic device with entity connectors according to the first embodiment of the present invention. FIG. 6 illustrates a schematic drawing of the stereoscopic lens docking station with the wireless transmission module according to the first embodiment of the present invention.

In the first embodiment of the present invention, the stereoscopic lens docking station of the present invention is detachably connected to an electronic device with a single lens module. As shown in FIG. 2 to FIG. 5, the stereoscopic lens docking station 10 of the present invention is detachably connected to an electronic device 90. In the embodiment of the present invention, the electronic device 90 is a mobile phone, which comprises a first lens module 91 for capturing an image, and a first transmission interface 93. However, the present invention is not limited to that application; for example, the electronic device 90 can also be a tablet computer, a portable computer, a personal digital assistant (PDA), or other electronic devices.

As shown in FIG. 2 to FIG. 5, the stereoscopic lens docking station 10 comprises a second lens module 12, a chute 13, a hole 14, and a second transmission interface 15. The second lens module 12 has the same specifications as the first lens module 91 of the electronic device 90, such as the same pixels, shutter, aperture, and lens optical specifications, allowing the combination of the first lens module 91 and the second lens module 12 to capture a three-dimensional image; however, since the first lens module 91 and the second lens module 12 are respectively located on the different devices (one is on the electronic device 90, and the other one is on the stereoscopic lens docking station 10), the two lens modules may not be on the same horizontal plane; therefore, the focal length of the second lens module 12 must be adjusted to match the focal length of the first lens module 91. The second lens module 12 is located in the chute 13. The second lens module 12 can slide along the chute 13, allowing the second lens module 12 to move to a first position P or a second position P' in the chute 13; wherein when the second lens module 12 moves to the first position P, the second lens module 12 and the hole 14 are on a same horizontal line and arranged at a certain spacing (as shown in FIG. 2). When the second lens module 12 moves to the second position P', the second lens module 12 and the hole 14 are on a same vertical line and arranged at a certain spacing (as shown in FIG. 3). It is to be noted that the abovementioned vertical line and horizontal line and the alignment, which are based on the angle and the orientation baseline in the drawing, are the relative orientation rather than the absolute orientation; therefore, if the viewing angle changes, the relative orientation must be changed according to the viewing angle, and shall be considered as the same as the claim of the present invention or being equivalent. The position of the hole 14 is corresponding to the position of the first lens module 91 of the electronic device 90, allowing the first lens module 91 to be exposed to the hole 14, such that when the stereoscopic lens docking station 10 is connected to the electronic device 90, the first lens module 91 can still capture an image through the hole 14.

As shown in FIG. 5, the second transmission interface 15 can be an entity connector; for example, the entity connector of the second transmission interface 15 can be a plug, and the entity connector of the first transmission interface 93 can be a slot. When the stereoscopic lens docking station 10 is connected to the electronic device 90, the plug of the second transmission interface 15 will be connected to the entity connector slot of the first transmission interface 93. Furthermore, the second transmission interface 15 can also be a wireless transmission module; for example, as shown in FIG. 6, the second transmission interface 15 can be a radio frequency chip for coordinating the antenna, and the first transmission interface 93 of the electronic device 90 can be a wireless transmission module, such that the radio frequency chip can connect to the first transmission interface 93 of the electronic device 90 via a wireless connecting method (such as Bluetooth), allowing the stereoscopic lens docking station 10 to communicate to the electronic device 90 for delivering the image signal and the controlling signal; however, the signal delivering method of the present invention is not limited to that design.

The stereoscopic lens docking station 10 of the present invention can also comprise a battery module 16 for providing power to the second transmission interface 15 and the second lens module 12 when the second transmission interface 15 is the wireless transmission module and cannot obtain power from the electronic device 90. However, if the second transmission interface 15 is the entity connector, the stereoscopic lens docking station 10 can also comprise a battery module 16 for providing standby power to the electronic device 90 when connected to the electronic device 90.

Figure 7:
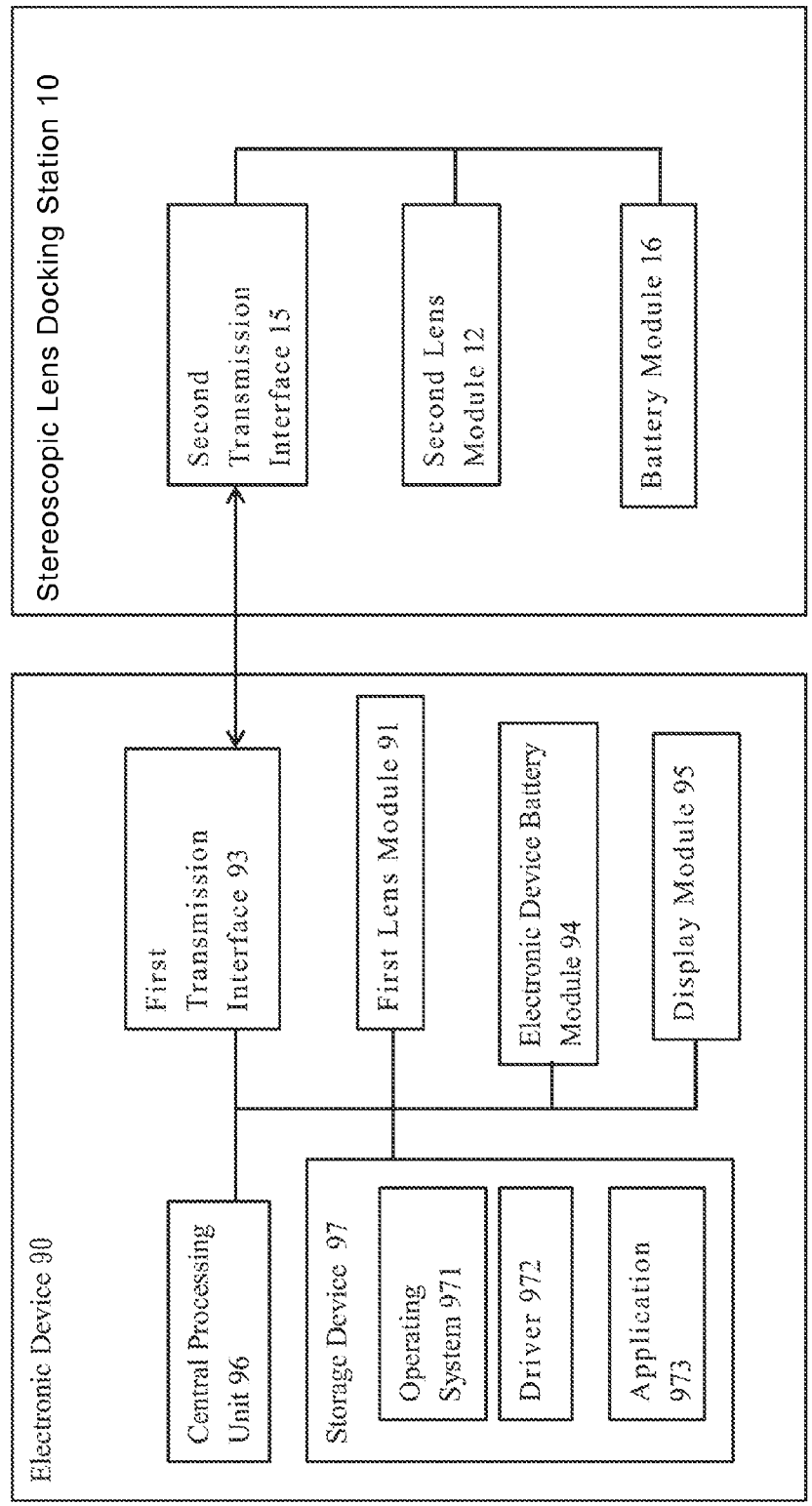
FIG. 7 illustrates a system structure drawing of the stereoscopic lens docking station which communicates to the electronic device according to the first embodiment of the present invention.

Please refer to FIG. 7, which illustrates a system structure drawing of the stereoscopic lens docking station which communicates to the electronic device according to the first embodiment of the present invention.

As shown in FIG. 7, in the first embodiment of the present invention, the electronic device 90 also comprises an electronic device battery module 94, a display module 95, a central processing unit 96, and a storage device 97. The electronic device battery module 94 is electrically connected to the central processing unit 96 for providing power to the electronic device 90. When the stereoscopic lens docking station 10 is connected to the electronic device 90 via the entity connectors, the electronic device battery module 94 can provide power to the stereoscopic lens docking station 10. The display module 95 is used for presenting the pictures to the user and is electrically connected to the central processing unit 96. The central processing unit 96 is used for calculating and processing data and is electrically connected to the first lens module 91 and the first transmission interface 93. The storage device 97 is electrically connected to the central processing unit 96; the storage device 97 comprises an operating system 971, a driver 972, and an application 973. The operating system 971 is used for managing the software and the hardware of the electronic device 90. The driver 972 is used for driving the first lens module 91 and the second lens module 12 to capture the image. The application 973 is used for providing an operating interface for capturing the image and for integrating the images captured by the first lens module 91 and the second lens module 12. However, the present invention is not limited to the abovementioned description; furthermore, the electronic device battery module 94, the display module 95, the central processing unit 96, and the storage device 97 are the prior art, which are not the focus of the present invention, so there is no need for further description here.

In the present embodiment, when the first transmission interface 93 of the electronic device 90 is connected to the second transmission interface 15 of the stereoscopic lens docking station 10, the operating system 971 will detect the connecting of the first transmission interface 93 and the second transmission interface 15; via the connecting of the first transmission interface 93 and the second transmission interface 15, the operating system 971 will also detect the second lens module 12. Therefore, the user can operate the application 973 to issue an order to capture a three-dimensional image, allowing the application 973 to deliver the order to capture the three-dimensional image to the driver 972. After the driver 972 receives the order, the driver 972 will control the first lens module 91 to capture an image and deliver the image to the storage device 97, and the driver 972 will control the second lens module 12 to capture another image via the connecting of the first transmission interface 93 and the second transmission interface 15. After the second lens module 12 captures the image, the image will be delivered to the storage device 97 via the connection of the first transmission interface 93 and the second transmission interface 15. After the storage device 97 receives the images captured by the first lens module 91 and the second lens module 12, the central processing unit 96 and the application 973 will integrate the two images to form a three-dimensional image and store the three-dimensional image. The display module 95 can represent the three-dimensional image to the user. However, the process of forming the three-dimensional image of the present invention is not limited to that design.

In one embodiment of the present invention, via the stereoscopic lens docking station 10 of the present invention, the electronic device 90 can capture not only a vertical three-dimensional image but also a transverse three-dimensional image.

In one embodiment of the present invention, the first lens module 91 and the second lens module 12 both comprise image sensors 911, 121 of types such as a complementary metal-oxide semiconductor (CMOS) or a charge-coupled device (CCD). The image sensors 911, 121 are used for transforming the received light into digital signals. The image sensors 911, 121 are usually designed as a transverse rectangle shape for capturing a transverse image which fits the feature of human binocular vision that the width is greater than the height. As shown in FIG. 2, when the second lens module 12 moves to the first position P in the chute 13, the second lens module 12 and the first lens module 91, which is exposed to the hole 14, will be located on a same horizontal line. At this moment, the user can vertically hold the electronic device 90 combined with the stereoscopic lens docking station 10; via operating the application 973 of the electronic device 90, the user can issue the order to capture the image to the driver 972, allowing the driver 972 to drive the second lens module 12 and the first lens module 91 to respectively capture individual images. The image captured by the second lens module 12 is delivered to the electronic device 90 via the second transmission interface 15; then the application 973 and the central processing unit 96 of the electronic device 90 process the two images captured by the second lens module 12 and the first lens module 91, allowing the two images to be integrated to form a transverse three-dimensional image.

As shown in FIG. 3, when the second lens module 12 moves to the second position P' in the chute 13, the second lens module 12 and the first lens module 91, which is exposed to the hole 14, will be located on a same vertical line. As shown in FIG. 4, at this moment, the user can transversely hold the electronic device 90 combined with the stereoscopic lens docking station 10, allowing the first lens module 91 of the transverse electronic device 90 and the second lens module 12 of the stereoscopic lens docking station 10 to be on a same horizontal line; the rectangle-shaped image sensors 121, 911 will change to a vertical rectangular arrangement from the original transverse rectangular arrangement, allowing the image sensors 121, 911 to respectively capture individual images to form the vertical three-dimensional image. At this moment, via operating the application 973 of the electronic device 90, the user can issue the order to capture the image to the driver 972, allowing the driver 972 to drive the second lens module 12 and the first lens module 91 to respectively capture individual images. The image captured by the second lens module 12 is delivered to the electronic device 90 via the second transmission interface 15, allowing the application 973 and the central processing unit 96 of the electronic device 90 to process the images captured by the second lens module 12 and the first lens module 91, and integrate the two images to form a vertical three-dimensional image.

Figure 8:
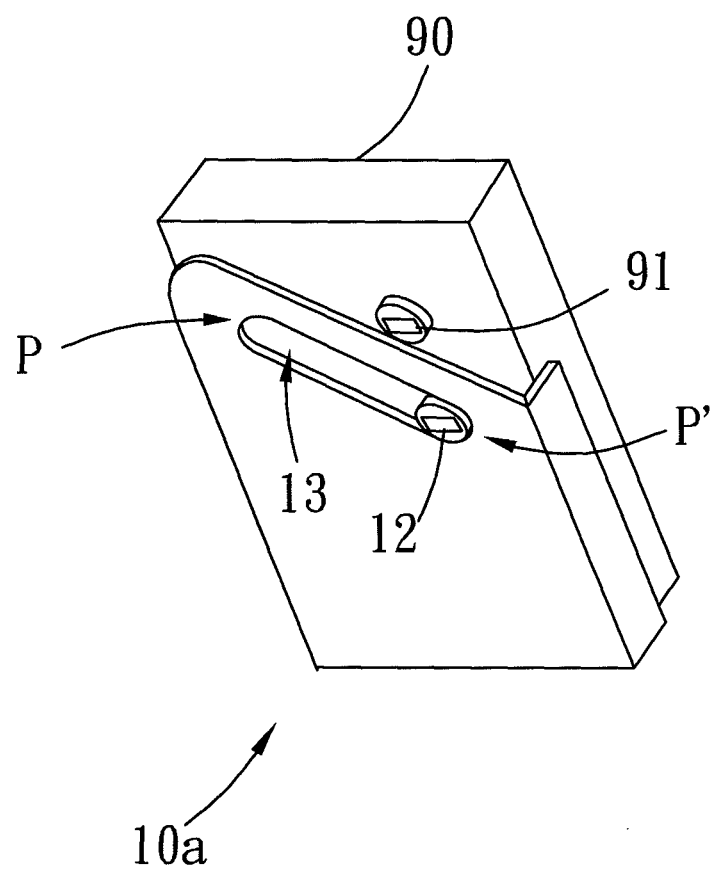
FIG. 8 illustrates an assembly schematic drawing of the stereoscopic lens docking station which covers half of the electronic device according to the second embodiment of the present invention.

Please refer to FIG. 8 about the stereoscopic lens docking station of the present invention according to the second embodiment. FIG. 8 illustrates an assembly schematic drawing of the stereoscopic lens docking station which covers half of the electronic device according to the second embodiment of the present invention.

As shown in FIG. 8, the difference between the second embodiment and the first embodiment of the present invention is that in the second embodiment, the stereoscopic lens docking station 10a does not comprise a hole 14. In the second embodiment, the stereoscopic lens docking station 10a is designed to cover half of the electronic device 90, leaving the first lens module 91 of the electronic device 90 to be exposed by the stereoscopic lens docking station 10a, such that the user can use the electronic device 90 to capture the image.

Figure 9:
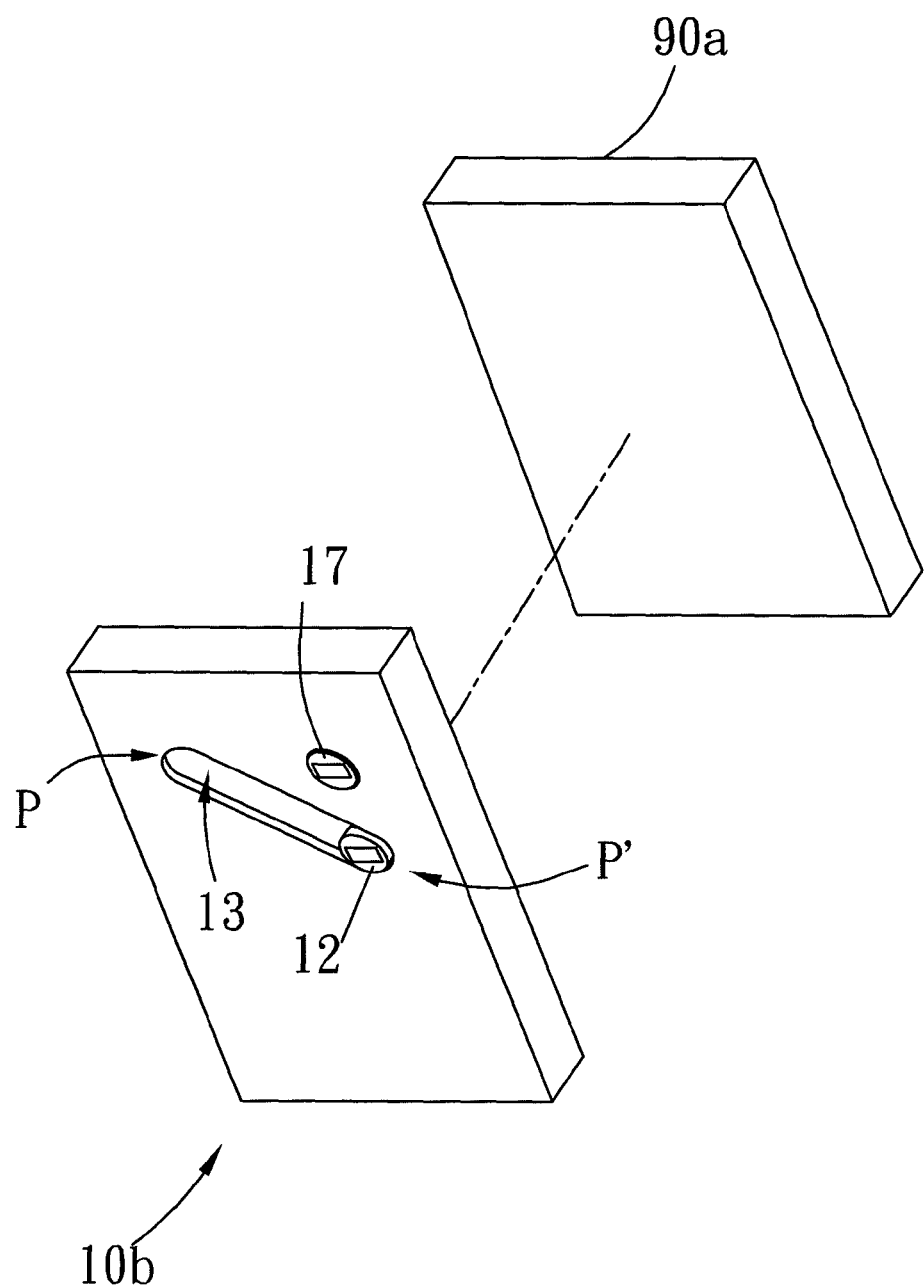
FIG. 9 illustrates a schematic drawing of the stereoscopic lens docking station with two lens modules and the electronic device according to the third embodiment of the present invention.
Figure 10:
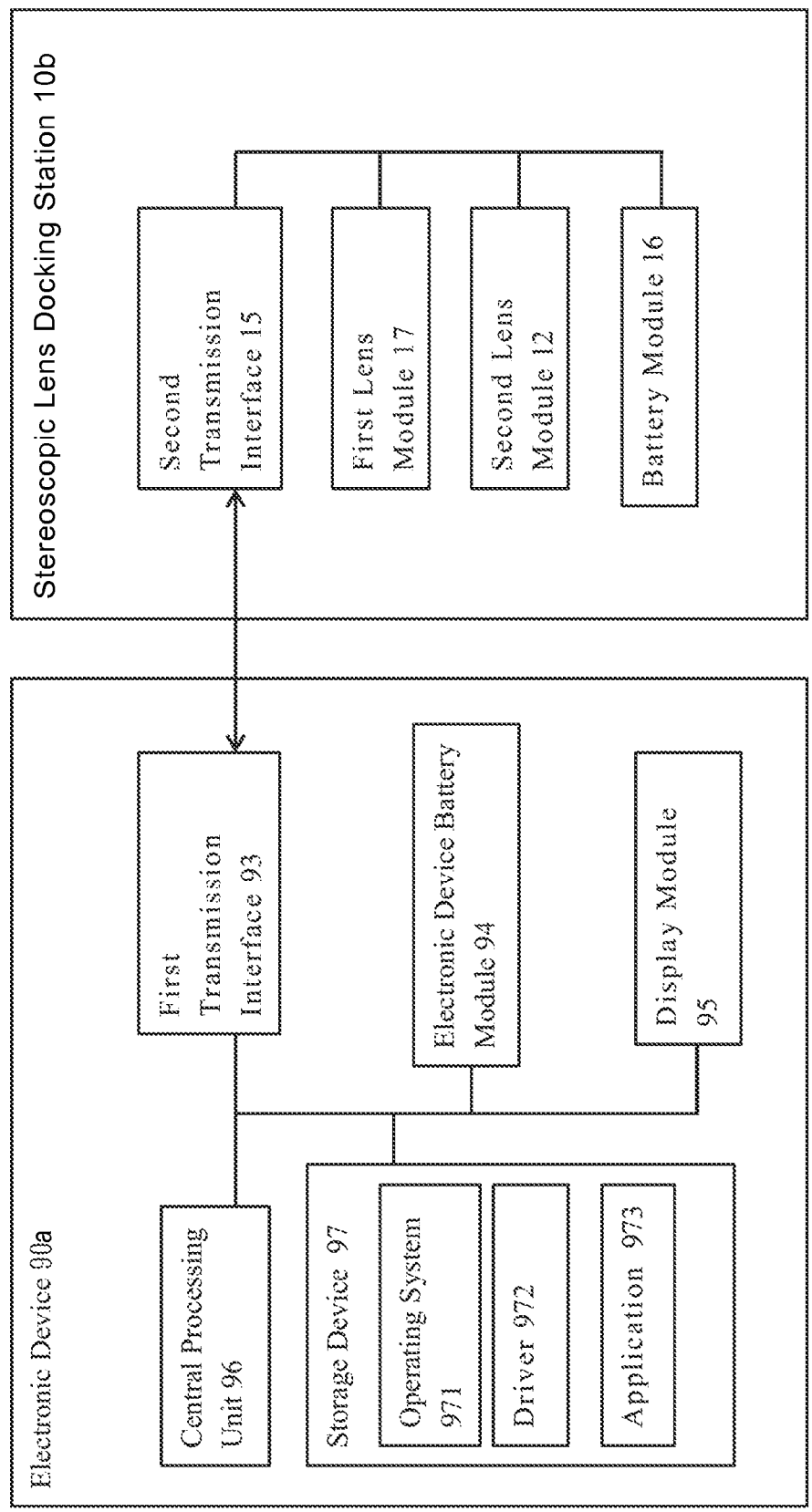
FIG. 10 illustrates a system structure drawing of the stereoscopic lens docking station which communicates to the electronic device according to the third embodiment of the present invention.

Please refer to FIG. 9 and FIG. 10 about the stereoscopic lens docking station of the present invention according to the third embodiment. FIG. 9 illustrates a schematic drawing of the stereoscopic lens docking station with two lens modules and the electronic device according to the third embodiment of the present invention. FIG. 10 illustrates a system structure drawing of the stereoscopic lens docking station which communicates to the electronic device according to the third embodiment of the present invention.

As shown in FIG. 9 and FIG. 10, the difference between the third embodiment and the first embodiment of the present invention is that in the third embodiment, the stereoscopic lens docking station 10b is detachably connected to the electronic device 90a without the lens module; the stereoscopic lens docking station 10b comprises two lens modules: the second lens module 12 and the first lens module 17; and the stereoscopic lens docking station 10b does not comprise a hole 14. The first lens module 17 is located in a position corresponding to the first position P and the second position P' of the chute 13, such that the position of the first lens module 17, the first position P, and the second position P' slightly represent a right-angled triangle; therefore, when the second lens module 12 moves to the first position P, the second lens module 12 and the first lens module 17 are located on the same horizontal line; when the second lens module 12 moves to the second position P', the second lens module 12 and the first lens module 17 are located on the same vertical line.

In the present embodiment, when the first transmission interface 93 of the electronic device 90a is connected to the second transmission interface 15 of the stereoscopic lens docking station 10b, the operating system 971 will detect the connecting of the first transmission interface 93 and the second transmission interface 15; via the connecting of the first transmission interface 93 and the second transmission interface 15, the operating system 971 can detect the first lens module 17 and the second lens module 12. Therefore, via operating the application 973 of the electronic device 90a, the user can issue the order to capture the image to the driver 972; via the connecting of the first transmission interface 93 and the second transmission interface 15, the driver 972 can drive the second lens module 12 and the first lens module 17 of the stereoscopic lens docking station 10b to respectively capture individual images. The images captured by the second lens module 12 and the first lens module 17 are delivered to the electronic device 90a via the second transmission interface 15, allowing the application 973 and the central processing unit 96 of the electronic device 90a to process the images captured by the second lens module 12 and the first lens module 17 and integrate the images to form a three-dimensional image.

It is to be noted that the stereoscopic lens docking station 10b of the third embodiment of the present invention not only can be applied to the electronic device 90a without the lens module, allowing the electronic device 90a to be able to capture the image and the three-dimensional image, but also can be applied to the electronic device 90 with the lens module, such that the electronic device 90 can capture the three-dimensional image via the first lens module 17 and the second lens module 12 without using the original lens module.

In conclusion regarding the invention, the stereoscopic lens docking station 10 of the present invention can achieve the following efficacy: (1) when the user wants to capture a three-dimensional image, the user does not need to additionally buy an electronic device 90 with a stereoscopic lens module 110 (such as a mobile phone with a stereoscopic lens module); the user just needs to apply the stereoscopic lens docking station 10 of the present invention to the electronic device 90, allowing the electronic device 90 to be able to capture the three-dimensional image; (2) via the structure design of the present invention, the user can choose to capture a transverse or a vertical three-dimensional image by pushing the second lens module 12 to the appropriate position in the chute 13, and by changing the direction of holding the mobile phone; (3) via the external module design of the present invention, neither the structure nor the hardware design of the electronic device 90 needs to be changed; therefore, the electronic device 90 can still keep the original shape and weight, to achieve the effect of saving the design cost.

It is noted that the above-mentioned embodiments are only for illustration. It is intended that the present invention cover modifications and variations of this invention provided they fall within the scope of the following claims and their equivalents. Therefore, it will be apparent to those skilled in the art that various modifications and variations can be made to the structure of the present invention without departing from the scope or spirit of the invention.

What is claimed is:
1. A stereoscopic lens docking station, used for detachably connecting to an electronic device, wherein the electronic device comprises a first lens module and a first transmission interface, the stereoscopic lens docking station comprising;
    a chute located next to the first lens module of the electronic device;
    a second lens module being able to slide along the chute to a position corresponding to the first lens module; and
    a second transmission interface used for communicating with the first transmission interface of the electronic device, and electrically connecting to the second lens module, allowing the electronic device to control the second lens module to capture an image, and obtain the image, whereby the two images captured by the first lens module and the second lens module can be integrated to form a three-dimensional image;
    wherein the second lens module can slide to a first position or a second position in the chute; when the second lens module slides to the first position, the second lens module and the first lens module of the electronic device are on one of a same horizontal line and a same vertical line and arranged at a certain spacing; when the second lens module slides to the second position, the second lens module and the first lens module of the electronic device are on another one of the same horizontal and the same vertical line, and arranged at a certain spacing.

2. The stereoscopic lens docking station as claimed in claim 1, wherein when the first lens module and the second lens module are arranged at the certain spacing on the same horizontal line, the two images will be integrated to form a transverse three-dimensional image.

3. The stereoscopic lens docking station as claimed in claim 1, wherein when the first lens module and the second lens module are arranged at the certain spacing on the same vertical line, the two images will be integrated to form a vertical three-dimensional image.

4. The stereoscopic lens docking station as claimed in claim 1, further comprising a hole; a position of the hole is corresponding to a position of the first lens module, allowing the first lens module to be exposed to the hole.

5. The stereoscopic lens docking station as claimed in claim 1, wherein the first transmission interface and the second transmission interface are respectively an entity connector.

6. The stereoscopic lens docking station as claimed in claim 1, wherein the first transmission interface and the second transmission interface are respectively a wireless transmission module.

7. The stereoscopic lens docking station as claimed in claim 5, wherein the stereoscopic lens docking station further comprises a battery module for providing standby power to the electronic device via the entity connectors of the first transmission interface and the second transmission interface.

8. The stereoscopic lens docking station as claimed in claim 6, wherein the stereoscopic lens docking station further comprises a battery module for providing power to the wireless transmission module of the second transmission interface and the second lens module.

9. A stereoscopic lens docking station, used for detachably connecting to an electronic device; the electronic device comprises a first transmission interlace, the stereoscopic lens docking station comprising:
a first lens module;
a chute located next to the first lens module of the stereoscopic lens docking station;
a second lens module being able to slide along the chute to a position corresponding to the first, lens module; and
a second transmission interface used for communicating to the first transmission interface of the electronic device, and electrically connecting to the first lens module and the second lens module, allowing the electronic device to control the first lens module and the second lens module to respectively capture individual images, and obtain the images whereby the two images captured by the first lens module and the second lens module can be integrated to form a three-dimensional image;
wherein the second lens module can slide to a first position or a second position in the chute; when the second lens module slides to the first position, the second lens module and the first lens module of the stereoscopic lens docking station are on one of a same horizontal line and a same vertical line, arranged at a certain spacing; when the second lens module slides to the second position, the second lens module and the first lens module of the stereoscopic lens docking station are on another one of the same horizontal line and the same vertical line, and arranged at a certain spacing.

10. The stereoscopic lens docking station as claimed in claim 9, wherein when the first lens module and the second lens module are arranged at the certain spacing on the same horizontal line, the two images will be integrated to form a transverse three-dimensional image.

11. The stereoscopic lens docking station as claimed in claim 9, wherein when the first lens module and the second lens module are arranged at the certain spacing on the same vertical line, the two images will be integrated to form a vertical three-dimensional image.

12. The stereoscopic lens docking station as claimed in claim 9, wherein the first transmission interface and the second transmission interface are respectively an entity connector.

13. The stereoscopic lens docking station as claimed in claim 9, wherein the first transmission interface and the second transmission interface are respectively a wireless transmission module.

14. The stereoscopic lens docking station as claimed in claim 12, wherein the stereoscopic lens docking station further comprises a battery module for providing standby power to the electronic device via the entity connectors of the first transmission interface and the second transmission interface.

15. The stereoscopic lens docking station as claimed in claim 13, wherein the stereoscopic lens docking station further comprises a battery module for providing power to the wireless transmission module of the second transmission interface, the first lens module, and the second lens module.

* * * * *